US006039024A

United States Patent [19]

Carlson et al.

[11] Patent Number: 6,039,024

[45] Date of Patent: Mar. 21, 2000

[54] THROTTLE CONTROL SYSTEM

[75] Inventors: John Carlson, Wayne, Pa.; Bernard Driggers, Wichita, Kans.

[73] Assignee: Capro, Inc., Willis, Tex.

[21] Appl. No.: 09/203,872

[22] Filed: Dec. 2, 1998

[51] Int. Cl.$^{7}$ .............................. F16K 31/46; F02D 11/02

[52] U.S. Cl. .......................... 123/396; 123/398; 123/400; 74/501.6

[58] Field of Search ..................................... 123/396, 398, 123/400, 403; 74/501.6, 489, 516, 567; 251/294

[56] References Cited

U.S. PATENT DOCUMENTS

| | | | |
|---|---|---|---|
| 4,807,580 | 2/1989 | Clark | 123/398 |
| 4,867,122 | 9/1989 | Kono et al. | 123/396 |
| 5,078,108 | 1/1992 | Ishikawa et al. | 123/342 |
| 5,517,967 | 5/1996 | Nakayama | 123/398 |
| 5,551,395 | 9/1996 | Isaacs et al. | 123/339.13 |
| 5,685,271 | 11/1997 | Taomo et al. | 123/398 |
| 5,758,546 | 6/1998 | Taomo et al. | 74/501.6 |
| 5,765,445 | 6/1998 | Miyata | 74/501.6 |
| 5,826,667 | 10/1998 | Notaras et al. | 172/15 |
| 5,871,202 | 2/1999 | Taomo et al. | 251/294 |

*Primary Examiner*—Willis R. Wolfe
*Assistant Examiner*—Hieu T. Vo
*Attorney, Agent, or Firm*—Jenkens & Gilchrist, A Professional Corporation

[57] ABSTRACT

A throttle control system in a first position allows movement of an actuator arm by a trigger to move a cable connected to an engine such that the engine may operate between idle and full speed. In a second position, the actuator arm rests against a stationary cam so that the engine operates at a predetermined speed irrespective of the position of the trigger.

30 Claims, 2 Drawing Sheets

THROTTLE CONTROL SYSTEM

FIELD

The present invention relates to systems for controlling the position of the speed of a device using a gasoline powered engine; more particularly, the present invention pertains to trigger actuated throttle control systems.

BACKGROUND

In recent years, gasoline powered string trimmers and gasoline powered blowers have experienced greater use by commercial gardeners and by owners of residences. Such gasoline powered string trimmers and gasoline powered blowers are typically operated where the throttle portion of the carburetor is in a wide open position. However, when a gasoline powered string trimmer is used along a chain link fence or along a concrete wall, it is often desirable to reduce the speed of the engine to avoid rapid consumption of the cutting line caused by contact of the cutting line with the chain link fence or the concrete wall. When using gasoline powered blowers, it is also desirable to reduce the engine speed of these blowers when attempting to gather together a small pile of debris for easy pickup or when blowing debris out of confined areas. Reducing the engine speed of a string trimmer or a blower requires repositioning the trigger.

Prior art throttle control systems found on string trimmers and blowers are designed to use the first and second fingers of an operator's right hand to move the trigger. Accordingly, the position of the first and second fingers of an operator's right determine the position of the trigger which in turn, determines the speed of the gasoline powered engine. At full speed all the fingers on the operator's right hand are together and can comfortably support the weight of the string trimmer or blower. At reduced speeds partial movement of the trigger to achieve a reduced speed of the gasoline engine causes the full weight of either the string trimmer or the blower to be supported by only the ring and little fingers of the right hand instead of all four fingers. Prolonged two finger support of a string trimmer or a blower is particularly uncomfortable for the operator and could possibly create a dangerous operational condition.

There is therefore a need in the art to provide a throttle control system for a gasoline powered string trimmer or blower which allows the operator to comfortably support the weight of a gasoline powered string trimmer or blower in the same manner that it is supported when the engine is in full operating speed yet, at the same time, permit the engine to run at a reduced engine speed.

SUMMARY

The throttle control system of the present invention allows an operator to comfortably support the weight of a gasoline powered string trimmer or blower operating at a reduced speed in the same manner as when the string trimmer or blower is operating at full speed.

A system for remotely controlling the speed of a gasoline engine on a string trimmer or blower is constructed for the purpose of imparting motion to a throttle control cable by finger engagement with a trigger assembly. The throttle control cable is connected to a system on the engine, typically the carburetor, which controls the speed of the engine. The throttle control cable is moved by the arcuate rotation of an actuator arm about a pivot shaft. The actuator arm is moved by the trigger when a key on the actuator arm assembly is engaged with a keyway on the trigger assembly.

When the key on the actuator arm assembly is engaged with the keyway on the trigger assembly, the movement of the trigger will cause the cable connected to the actuator arm to move so that the engine may operate at any speed between idle and full speed.

By the placement of finger pressure on an axial shaft extending from the pivotably movable actuator arm assembly the key on the actuator arm assembly is moved out of engagement with the keyway on the trigger assembly providing engine speed is greater than secondary speed. When the key and keyway are not engaged, the position of the actuator arm is determined by the physical contact of the actuator arm with a rotatably positionable cam. The position of the rotatably positionable cam determines the arcuate position of the actuator arm, thus the position of the throttle control cable and accordingly, the speed of the engine. When the key on the actuator arm assembly is out of engagement with the keyway on the trigger assembly, the trigger itself may be moved into any position which is comfortable on the fingers of the operator. Re-engagement of the key on the actuator arm assembly and the keyway on the trigger assembly is accomplished by first allowing the trigger to return to its idle speed position.

DESCRIPTION OF THE DRAWING FIGURES

A better understanding of the throttle control system of the present invention may be had by reference to the drawing figures wherein.

DESCRIPTION OF THE EMBODIMENTS

Figure 1:
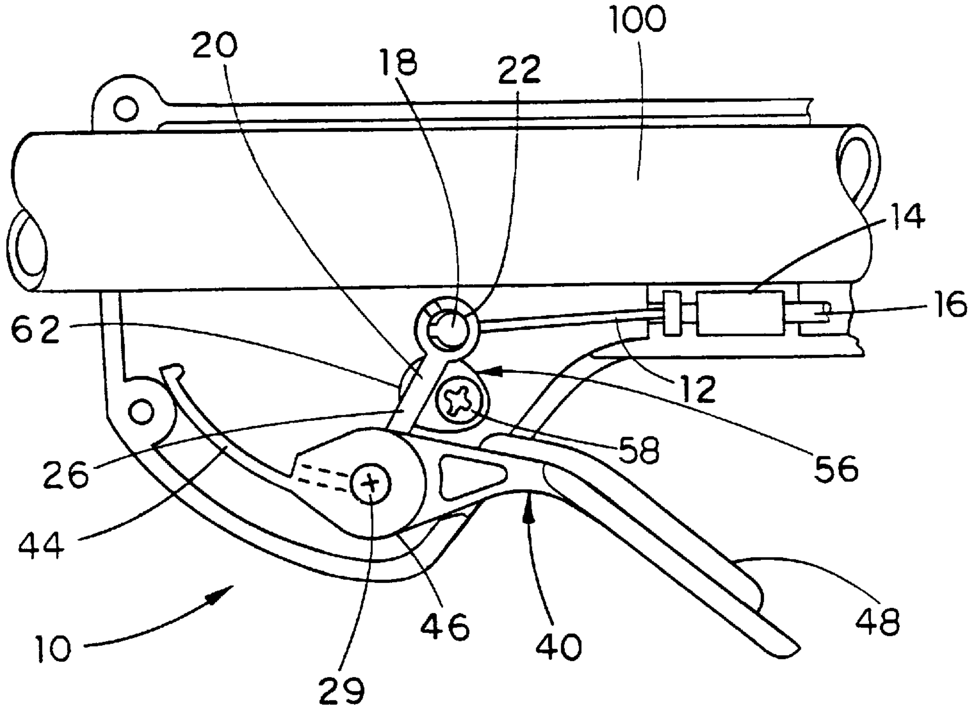
FIG. 1 is a front elevational view in partial section of the throttle control system of the present invention.
Figure 2:
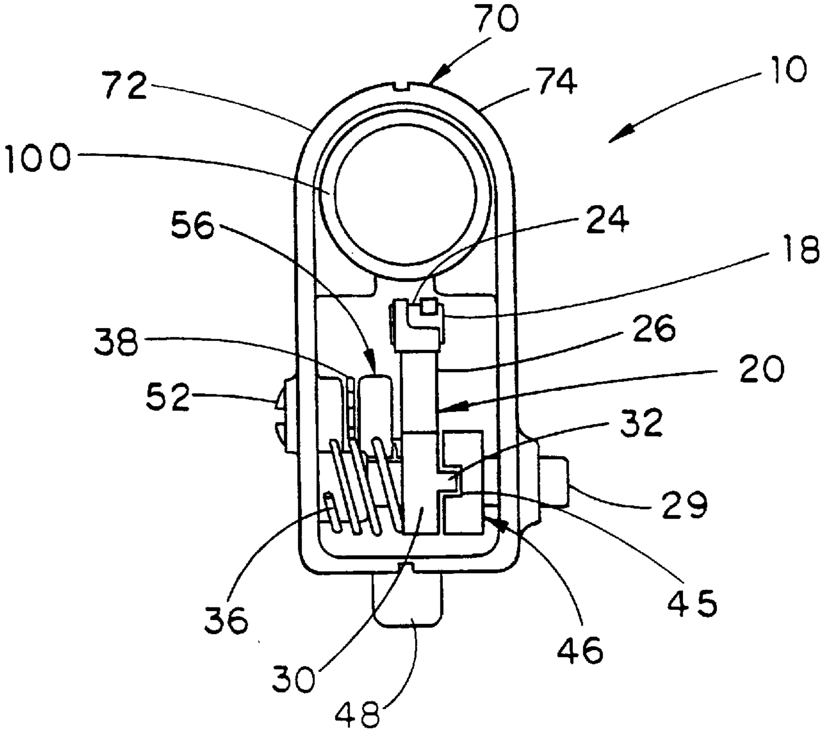
FIG. 2 is a side elevational view in partial section of the throttle control system shown in FIG. 1.
Figure 3:
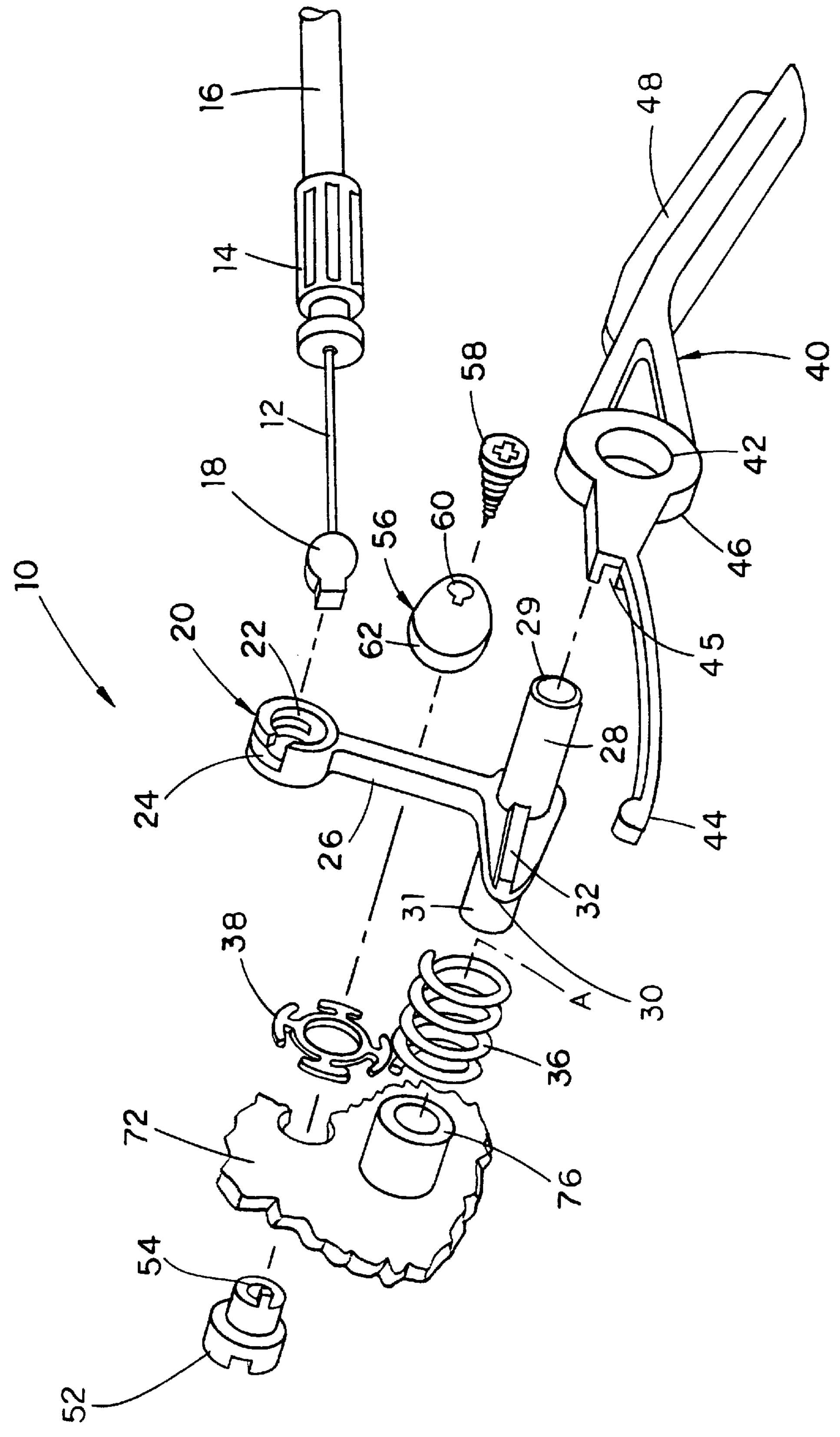
FIG. 3 is an exploded perspective view of the throttle control system shown in FIGS. 1 and 2.

As may be seen in FIGS. 1, 2 and 3, the throttle control system 10 of the present invention is designed to allow the operator to run the gasoline engine on a string trimmer or a blower at a partial or reduced carburetor setting while allowing the trigger 48 to be at its fully depressed position. This allows the operator to comfortably support the weight of the string trimmer or the blower with all the fingers on one hand while the engine is operating at a reduced speed.

The trigger assemblies typically used on prior art assemblies for the control of a throttle on a gasoline powered engine have a one-piece design. The lever portion of the trigger which contacts the operator's fingers on these prior art controls is formed integrally with an arm to which a cable is attached. In the throttle control system 10 of the present invention, a two-piece construction has been adopted. Specifically, a pivotably movable actuator arm assembly 20 is formed separately from the trigger assembly 40 although both the pivotably movable actuator arm assembly 20 and the trigger assembly 40 both pivot with respect to the same axis A. The pivotably movable actuator arm assembly 20 includes a key 32 so that it may rotate in an arcuate fashion together with the trigger assembly 40 when the key 32 is within keyway 45. When the key 32 is within the keyway 45 full depression of the trigger assembly 40 achieves a wide open throttle condition. A compression spring 36 biases the key 32 and the keyway 45 together.

When both the trigger assembly 40 and the pivotably movable actuator arm assembly 20 are in a position associated with a wide open throttle condition, the operator is able to push a button 29 formed on the end of the actuator arm pivot shaft 28. The button extends outwardly from the left side 74 of the control housing assembly 70. Pushing the button 29 causes the entire actuator arm assembly 20 to shift along the long axis of the pivot shaft 28 and become disengaged from the trigger assembly 40. The spring forces normally associated with the carburetor on the gasoline powered engine will cause the throttle to move toward its idle operating state. The throttle control cable 12 which is attached to the carburetor will pull on the actuator arm assembly 20 which in turn causes the arm portion 26 of the actuator arm assembly 20 arm to rotate towards the idle position until the arm portion 26 contacts the outer surface a cam assembly 56 which is mounted to the right side 22 of the housing assembly 70. When the arm portion 26 of the pivotably movable actuator arm assembly 20 contacts the cam assembly 56, the gasoline powered engine will now be running at a reduced speed while the trigger 48 can be put in its fully depressed or wide open throttle position. This enables the weight of the unit to be supported by all four fingers of the operator's hand while the engine is operating at a reduced speed.

If the operator chooses to release the trigger 48, the force from the spring bias 44 member cause the trigger 48 to rotate back to its idle position. As the keyway portion 45 of the trigger assembly 40 rotates past the key support portion 30 of the actuator arm assembly 20, the keyway 45 on the trigger assembly 40 and the key 32 on the actuator arm assembly 20 will become re-engaged as the actuator arm assembly 20 slides back toward the trigger assembly 40 due to the force of the compression spring 36. Because the actuator arm assembly 20 has shifted sideways to re-engage the key 32 with the keyway 45 on the trigger assembly 40, the arm portion 26 of the pivotably movable actuator arm assembly 20 no longer contacts the partial throttle cam assembly 56. Without contact of the arm portion 26 of the pivotably movable actuator arm assembly 20 against the outer surface 62 of the cam assembly 56, the pivotably movably actuator arm assembly 20 is once again allowed to rotate with the trigger 48 back to the idle position.

Whenever the partial throttle feature has been selected, the operator can return to a wide open throttle engine speed simply by releasing the trigger 48 and allowing it to return to the idle position and then fully depressing the trigger 48 back to its wide open throttle position. This will enable the unit to once again run at full speed until the operator either selects a partial throttle position again or releases the trigger 48 back to its idle position.

The position of the throttle cam assembly 56 is rotatably adjustable to provide an infinite number of positions for the actuator arm 26 to contact when the pivotably movable actuator arm assembly 20 is disengaged from the trigger assembly 40. The adjustment of the throttle cam assembly 56 compensates for any tolerance variation in the partial throttle carburetor position on the gasoline powered engine. The adjustment of the throttle cam assembly 56 also allows the operator to set the throttle position control for higher or lower partial engine speeds as desired for particular operating conditions.

By further reference to drawing FIG. 1 and FIG. 2, it may be seen that the system for remotely controlling the speed of an engine is attached to a shaft 100. Such shafts 100 are typically used with gasoline powered string trimmers or blowers. The shaft 100 provides a mounting for the housing assembly 70 in which the engine speed control system 10 of the present invention is contained. By depressing the finger engagement portion 48 of the trigger assembly 40, the arm portion 26 of the pivotably movable actuator arm assembly 20 is caused to arcuately move in a counter-clockwise direction. This counter-clockwise direction imparts a force on the throttle control cable 12 which causes the throttle control cable 12 to move out of the conduit 16 through the conduit anchor 14. The throttle control cable 12 is attached to a throttle position or speed control on the gasoline powered engine. Accordingly, when the trigger 48 is depressed, the engine speeds up. The trigger 48 is biased into an idle position by the contact of a bias portion 44 of the trigger assembly 40 with the interior of the housing assembly 70. On the end of the throttle control cable 12 is a diecast barrel 18 or similar type fitting. The diecast barrel 18 is sized to fit within opening 22 when the throttle control cable 12 passes through the slot 24 on the end of the arm portion 26 of the actuator arm assembly 20

As shown in FIG. 2, the trigger assembly 40 and the pivotably movable actuator arm assembly 20 are connected one with another by the engagement of a key 32 on the key support portion 30 of the pivotably movable actuator arm assembly 20 with a keyway 45 located in the central portion 46 (FIG. 1) of the trigger assembly. When the key 32 and the keyway 45 are engaged, the trigger assembly 40 and the pivotably movable actuator arm assembly 20 move together.

As may be seen by reference to FIG. 2 and FIG. 3, the pivotably movable actuator arm assembly 20 and the trigger assembly 40 are two separate pieces. Thus, when it is desired to disengage the key 32 on the pivotably movable actuator arm assembly 20 from the keyway 45 on the trigger assembly 40, linear force in a direction perpendicular to the plane of movement of the pivotably movable actuator arm assembly 20 is placed on the push button end 29 of the shaft 28 about which the arm portion 26 of the pivotably movable actuator arm assembly 20 moves. The exertion of force on the push button end 29 of the shaft 28 compresses a spring 36 as the support section 31 of the shaft 28 moves deeper within a socket 76 formed on the right side 72 of the housing assembly 70.

To retain the pivotably movable actuator arm assembly 20 in position a stop is needed as the pivotably movable actuator arm assembly 20 would rotate back to the idle position because of the spring bias of the carburetor or speed control of the engine. However, such arcuate movement is prevented by the stationary cam assembly 56 which is affixed to the right side 72 of the housing assembly 70. A cam assembly 56 is used so that a variety of different positions may be obtained by the pivotably movable actuator arm assembly 20. By rotating the screw adjustment 52 which is on the exterior of the right side 72 housing assembly, the cam assembly 56 may be rotated by the engagement of a tang 54 with an opening 60 in the cam. Holding the cam assembly 56 in position and providing a spring bias for the cam assembly 56 is a wave washer 38. Connecting the cam assembly 56 to the screw adjustment 52 is a screw 58 which passes through the circular portion of the opening 60 in the cam and threadably engages the interior of the screw adjustment 52.

Accordingly, when the key 32 and the keyway 45 are engaged, the pivotably movable actuator arm assembly 20 is in a first position. When the 32 key and the keyway 45 are disengaged and the arm portion 26 of the pivotably movable actuator arm assembly 20 is against the outer surface 62 of the cam assembly 56, the pivotably movable actuator arm assembly 20 is said to be in a second position. To re-engage the key 32 on the key support portion 30 of the pivotably movable actuator arm assembly 20 with the keyway 45 on the trigger assembly 40, the trigger 48 is moved to the idle position. This movement will allow the spring bias force of the compression spring 36 to move the support section 31 of the shaft 28 out of the socket 76 on the right side 72 of the housing assembly 70 and allow the shaft 28 on the opposite side of the pivotably movable actuator arm assembly 20 to move back through bore 42 in the central portion 46 of the trigger assembly 40 and thence through the left side 74 of the housing assembly 70 thus reengaging the key 32 with the keyway 45.

Those of ordinary skill will understand that while the present invention has been described by reference to its preferred embodiment, other embodiments of the present invention have now been enabled. Such other embodiments shall be included within the scope and meaning of the appended claims.

What is claimed is:

1. A system for remotely controlling the speed of an engine, said system comprising:

a cable connected to means for controlling the speed of an engine;

a pivotably movable actuator arm connected to said cable so that arcuate movement of said pivotably movable actuator arm about a pivot axis moves said cable;

a trigger constructed and arranged to releasably engage said pivotably movable actuator arm, said trigger having a range of positions from fully extended where the engine is at idle speed to fully depressed where the engine is at full speed;

said pivotably movable actuator arm releasably engaging said trigger when said pivotably movable actuator arm is in a first position;

means for moving said pivotably movable actuator arm to a second position so that said trigger becomes disengaged from said pivotably movable actuator arm;

means for limiting the arcuate movement of said pivotably movable actuator arm when said pivotably movable actuator arm is in said second position;

whereby when said trigger is fully depressed with said pivotably movable actuator in said second position, the engine speed will be determined by said means for limiting the arcuate movement of said pivotably mounted actuator arm.

2. The system for remotely controlling the speed of an engine as defined in claim 1 wherein said means for limiting the arcuate movement of said pivotably moveable actuator arm is a stationary cam.

3. The system for remotely controlling the speed of an engine as defined in claim 2 wherein said stationary cam and said pivotably moveable actuator arm are contained within a housing.

4. The system for remotely controlling the speed of an engine as defined in claim 3 wherein said stationary cam is rotationally and adjustably mounted to the interior of said housing.

5. The system for remotely controlling the speed of an engine as defined in claim 1 wherein said pivotably moveable actuator arm is spring biased into said first position.

6. The system for remotely controlling the speed of an engine as defined in claim 1 wherein said engagement of said pivotably moveable actuator arm with said trigger is a key and keyway engagement.

7. The system for remotely controlling the speed of an engine as defined in claim 1 wherein said pivotably moveable actuator arm is moved from said first position to said second position by exerting force on said pivotably moveable actuator arm along said pivot axis.

8. The system for remotely controlling the speed of an engine as defined in claim 1 wherein said pivotably movable actuator arm is moved from said second position to said first position by moving said trigger to said idle position.

9. A remotely located, trigger operated engine speed control system comprising:

a cable connected to means for controlling the speed of the engine;

a pivotably movable actuator arm connected to said cable;

a stationary cam located in close proximity to said pivotably movable actuator arm;

said pivotably movable actuator arm being slidable between a first position and a second position;

said first position being in engagement with the trigger;

said second position being out of engagement with the trigger and resting against said stationary cam.

10. The remotely located, trigger operated engine speed control system as defined in claim 9 wherein said pivotably mounted movable actuator arm and said stationary cam are contained within a housing.

11. The remotely located, trigger operated engine speed control system as defined in claim 10 wherein said stationary cam is adjustably and rotatably mounted to the interior of said housing.

12. The remotely located, trigger operated engine speed control system as defined in claim 9 wherein said pivotably movable actuator arm is spring biased into said first position.

13. The remotely located, trigger operated engine speed control system as defined in claim 9 wherein said engagement of said pivotably movable actuator arm with the trigger is a key and keyway engagement.

14. The remotely located, trigger operated engine speed control system as defined in claim 9 wherein said movement of said pivotably movable actuator arm from said first position to said second position is effected by the application of force on said pivotably movable actuator arm in a plane perpendicular to the plane of movement of said pivotably movable actuator arm.

15. The remotely located, trigger operated engine speed control system as defined in claim 9 wherein said pivotably movable actuator arm in s aid second position resting against said stationary cam allows unrestricted movement of the trigger.

16. A system for remotely controlling the speed of an engine both from idle speed to full speed and at a predetermined speed, said system for remotely controlling the speed of an engine comprising:

a cable connected to means for controlling the speed of on the engine;

a pivotably movable actuator arm mounted to said cable;

a trigger constructed and arranged to releasably engage said pivotably movable actuator arm so that the position of said trigger determines the setting for the engine speed between idle speed and full speed;

a stationary cam mounted near said pivotably movable actuator arm;

said pivotably movable actuator arm having a first position wherein engine speed is controlled by the position of said trigger;

said pivotably movable actuator arm having a second position wherein the predetermined engine speed is set by contact between said pivotably movable actuator arm and said stationary cam irrespective of the position of said trigger;

whereby the engine may be operated at said predetermined speed while said trigger is in the full speed position.

17. The system for remotely controlling the speed of an engine as defined in claim 16 wherein said pivotably movable actuator arm and said stationary cam are contained within a housing.

18. The system for remotely controlling the speed of an engine as defined in claim 17 wherein said stationary cam is adjustably mounted to the interior of said housing.

19. The system for remotely controlling the speed of an engine as defined in claim 16 wherein said pivotably movable actuator arm is spring biased into said first position.

20. The system for remotely controlling the speed of an engine as defined in claim 16 wherein said engagement of said pivotably movable actuator arm with said trigger is a key and keyway engagement.

21. The system for remotely controlling the speed of an engine as defined in claim 16 wherein arcuate movement of said pivotably movable actuator arm is affected by the application of force on said pivotably movable actuator arm in a plane perpendicular to the plane of said arcuate movement of said pivotably movable actuator arm.

22. The system for remotely controlling the speed of an engine as defined in claim 16 wherein said pivotably movable actuator arm is moved from said second position to said first position by moving said trigger to the idle speed position.

23. A remotely located, trigger actuated engine speed control system for changing engine speed within a range of speeds from idle speed to full speed by changing the position of the trigger, said remotely located, trigger actuated engine speed control system comprising:

a cable mounted to an engine speed control on the engine;

a pivotably movable actuator arm connected to said cable;

a stationary cam mounted near said pivotably movable actuator arm;

means for locating said pivotably movable actuator arm in a first position wherein engine speed is controlled by the position of the trigger;

means for locating said pivotably movable actuator arm in a second position wherein engine speed is controlled by contact of said pivotably movable actuator arm with said stationary cam while the trigger is in the position associated with full speed of the engine.

24. The remotely located, trigger actuated engine speed control system is defined in claim 23 wherein said pivotably movable actuator arm and said stationary cam are mounted within a housing.

25. The remotely located. trigger actuated engine speed control system as defined in claim 24 wherein said stationary cam is adjustably mounted on the interior of said housing.

26. The remotely located, trigger actuated engine speed control system as defined in claim 23 wherein said pivotably movable actuator arm is spring biased into said first position.

27. The remotely located, trigger actuated engine speed control system as defined in claim 23 wherein said engagement of said pivotably movable actuator arm with the trigger is a key and keyway engagement.

28. The remotely located, trigger actuated engine speed control system as defined in claim 23 wherein movement of said pivotably movable actuator arm from said first position to said second position is effected by the application of force on said pivotably movable actuator arm in a plane perpendicular to the plane of movement of said pivotably movable actuator arm.

29. The remotely located, trigger actuated engine speed control system as defined in claim 23 wherein said pivotably movable actuator arm is moved from said second position to said first position by moving the trigger to the idle position.

30. A system for remotely controlling the speed of an engine by manually positioning a trigger which also allows the engine to operate at a predetermined speed less than full speed, while the trigger is in a position normally associated with full speed of the engine, said system for remotely controlling the speed of an engine comprising:

a housing;

a stationary cam rotatably mounted to the inside of said housing;

an actuator arm mounted to a shaft, said shaft constructed and arranged for pivotal arcuate movement of said actuator arm about the long axis of said shaft within said housing, wherein the arcuate position of said actuator arm determines the engine speed;

a spring biasing said actuator arm into keyed engagement with the trigger;

said shaft extending through said housing so that said shaft may be moved on its long axis against said spring bias to disengage said keyed engagement of said actuator arm with the trigger and thereby cause the arcuate position of said actuator arm about said shaft to be determined by engagement of said actuator arm with said stationary cam;

whereby the trigger may be placed in a position associated with full speed of the engine but the speed of the engine will be determined by the position of the actuator arm against said stationary cam.

* * * * *